United States Patent
Auad

(10) Patent No.: US 6,533,449 B1
(45) Date of Patent: Mar. 18, 2003

(54) APPARATUS AND PROCESS FOR THE CONTINUOUS PREPARATION OF A FLUID, UTILIZING A FLUID RECYCLING MEANS INCLUDING A BUFFER

(75) Inventor: Rogerio Batista Auad, Porto Alegre (BR)

(73) Assignee: Renner Herrmann S.A., Porto Alegre (BR)

( * ) Notice: Subject to any disclaimer, the term of this patent is extended or adjusted under 35 U.S.C. 154(b) by 0 days.

(21) Appl. No.: 09/647,009

(22) PCT Filed: Mar. 26, 1999

(86) PCT No.: PCT/BR99/00021

§ 371 (c)(1),
(2), (4) Date: Feb. 12, 2001

(87) PCT Pub. No.: WO99/48602

PCT Pub. Date: Sep. 30, 1999

(30) Foreign Application Priority Data

Mar. 26, 1998 (BR) .............................................. 9801134

(51) Int. Cl.[7] .............................................. B01F 15/02
(52) U.S. Cl. ........................ 366/132; 366/134; 366/136; 366/152.1; 366/160.2
(58) Field of Search .............................. 366/132, 134, 366/136, 137, 152.1, 155.1, 160.1, 160.2, 182.1; 137/563

(56) References Cited

U.S. PATENT DOCUMENTS

| 3,244,407 A | * | 4/1966 | Obergfell et al. |
|---|---|---|---|
| 3,830,473 A | * | 8/1974 | Lieferman |
| 4,212,545 A | | 7/1980 | Lovasz et al. |
| 4,403,866 A | | 9/1983 | Falcoff et al. |
| 4,974,964 A | | 12/1990 | Yoshihara et al. |
| 5,127,772 A | | 7/1992 | Dewitz |
| 5,439,288 A | * | 8/1995 | Hoffman et al. |
| 5,522,660 A | * | 6/1996 | O'Dougherty et al. |
| 5,559,173 A | | 9/1996 | Campo et al. |
| 5,590,960 A | * | 1/1997 | Clinton et al. |
| 5,723,517 A | | 3/1998 | Campo et al. |
| 6,007,235 A | * | 12/1999 | Freud et al. |
| 6,288,783 B1 | * | 9/2001 | Auad |

FOREIGN PATENT DOCUMENTS

| EP | 0 308 027 | | 3/1989 |
|---|---|---|---|
| EP | 0 407 927 | | 1/1991 |
| EP | 0 646 409 | | 4/1995 |
| FR | 2 376 198 | | 7/1978 |
| WO | 99/41003 | * | 8/1999 |

* cited by examiner

Primary Examiner—Charles E. Cooley
(74) Attorney, Agent, or Firm—Smith, Gambrell & Russell

(57) ABSTRACT

An apparatus and process for the continuous preparation of a mixture of two or more fluids, such as paints, enamels and dyes, to produce a resulting fluid having desired pre-defined physical properties, such as a particular color, opacity, hue, saturation, luminosity, density and/or viscosity, with automatic adjustment of the physical characteristics of the resulting fluid mixture. The apparatus comprises storage devices, a mixer, a fluid supply device, a detector, and a control device. The control device is adapted to receive a signal from the detector, the signal representing the detected physical characteristic of a fluid supplied by the fluid supply device, and to compare the detected physical characteristic with a desired physical characteristic of the fluid. Depending on the comparison between detected and desired physical characteristics, a fluid supply control signal is sent to the fluid supply device which varies the proportion of each component of the fluid supplied to the mixer, until the detected physical characteristic is substantially the same as the desired physical characteristic.

13 Claims, 3 Drawing Sheets

APPARATUS AND PROCESS FOR THE CONTINUOUS PREPARATION OF A FLUID, UTILIZING A FLUID RECYCLING MEANS INCLUDING A BUFFER

TECHNICAL FIELD

The present invention relates to an apparatus and process for the continuous preparation of a mixture of two or more fluids, such as paints, enamels and dyes, to produce a resulting fluid having desired pre-defined physical properties, such as a particular color, opacity, hue, saturation, luminosity, density and/or viscosity.

BACKGROUND ART

Paint production processes have, over the years, evolved from the traditional method of using joint dispersion of pigments to the use of colorimetric processes where there is dispersion of each of the pigments separately to form a set of concentrated pigments (concentrates) and bases which are mixed together at the time of production of the paint to give a determined color. Such colorimetric processes can be classified in two categories, those with adjustment and those without adjustment.

In paint production processes with adjustment, the concentrates are mixed with resins and solvents, or, optionally, with determined bases, and the properties of the resulting mixture are measured. If the measured properties vary from the required specifications, an adjustment is made by the addition of ingredients capable of correcting the variations.

Paint production processes with adjustment are used in factories for the production of medium to large quantities of paints. Mixing occurs in large vats and the end product is only transferred to the final container after confirmation that its properties are within the specified limits.

In paint production processes without adjustment, the base and concentrates are supplied directly to the final container, after which the mixture is homogenised and the paint is ready for use. In such a production process there is no possibility for verification of and adjustments to the end product, and for this reason the base and concentrates have to have rigorously specified properties, and dosage of the base and concentrates has to be carefully controlled so that the end product meets the required specifications.

Paint production processes without adjustment are used, where the paint is to be produced at point of sale, for the supply of relatively small quantities of paint, having a wide range of colors and shades. Such processes can also be used in the factory for the production of small batches of paint.

In processes without adjustment, it is essential that the bases and concentrates are produced within strict limits of variation in color, opacity or hiding power, viscosity and density. The problem with such processes is that it is very difficult to produce the concentrates and bases within such strict limits of variation, only being possible with rigorous control and adjustment, making the process expensive and slow.

The need for such stringent standards of control and the requirement for adjustment mean that the process of producing the bases and concentrates is lengthy and expensive.

The normal methods of controlling and adjusting the bases and concentrates of each batch of paint consist of preparing the concentrate, or base, by culling with standard bases, applying a coat of paint to a substrate, then drying the paint followed by analysis of the color, hiding power and opacity (in the case of the bases) of the dried coat of paint, using visual or preferably spectrophotometric reflection methods. If the paint varies in any of its properties from that which is required, then further ingredients are mixed to compensate for the variation. Once these further ingredients have been added, the resulting concentrate or base is again analysed, and if it is still outside the tolerances for variation of any of the paint properties, another cycle of compensation and analysis is begun. Such a procedure is normally very time consuming, taking days before the paint batch is within its specified tolerance limits.

Also, apart from being time consuming, the traditional methods tend to be very wasteful of paint, because each test batch that does not meet the necessary requirements for color, opacity or hiding power is discarded, without re-using the paint. This can be extremely expensive where a large number of adjustments have to be made before the paint comes within the required specifications.

Efforts to solve such problems have been made, notably, U.S. Pat. No. 4,403,866 describes an apparatus and process for automatically making a paint having the color values of a standard paint, in which components of paint are fed into a mixer where they are combined, and the resulting combination is analysed spectrophotometrically to determine whether it comes within a desired color value. If the paint is not of the desired color, the ratio of paint components fed to the mixer is adjusted until the paint has the required color. Paint mixture that has been analysed and which does not meet the requirements is recycled continuously back into the mixer so that no paint is wasted. However, because the analysed paint is pumped directly back into the mixer the desired component ratio cannot be determined exactly.

There is, therefore, a need for a process in which both concentrates and bases can be analysed and their component ratios can be corrected quickly and simply, and in which paint that does not meet the specified requirements can be re-utilised by the system without adversely affecting the determined component ratios.

In order to cut down paint production costs to a minimum such a process needs to be automatic, with the minimum of human intervention, and to use apparatus which is capable of measuring the properties of the concentrates and bases, determining the ingredients, and quantities thereof required to correct any variations from the required physical properties of the concentrate or base, automatically supplying the correct amount of ingredients necessary to make the correction, and needs to be capable of guaranteeing that the final product has properties that are within the specified limits for the paint.

OBJECT OF THE INVENTION

The object of the present invention is to provide an apparatus and a process for the continuous preparation of fluids, such as paints, enamels and dyes with automatic adjustment of the physical properties of the fluid, and re-utilisation of any fluid that does not have the required physical properties, in order to overcome the above mentioned problems in the state of the art.

SUMMARY OF THE INVENTION

According to a first aspect of the present invention, an apparatus for the continuous preparation of a fluid with automatic adjustment of the physical characteristics thereof, comprises:

a storage means, for storing a first component of the fluid;

at least one further storage means, for storing at least one further component of the fluid;

mixing means, for mixing the first component with at least one further component of the fluid, the mixing means having a fluid input and a fluid output;

fluid supply means, connected between the storage means and fluid input of the mixing means, for supplying a specified proportion of each of the components of the fluid to the mixing means;

detector means, for detecting a physical characteristic of the fluid, the detector means being capable of producing a signal representing the detected physical characteristic, the detector means having a fluid input in communication with the fluid output of the mixing means and having a fluid output;

control means, adapted to receive the signal representing the detected physical characteristic, the control means being capable of comparing the detected physical characteristic with a desired physical characteristic of the fluid, and of producing a fluid supply control signal, dependent on the comparison between detected and desired physical characteristics, the fluid supply means being responsive to the fluid supply control signal to vary the proportion of each component of the fluid supplied to the mixing means, until the detected physical characteristic is substantially the same as the desired physical characteristic; and fluid recycling means, connected between the fluid output of the detector means and the input of the mixing means to allow fluid to return to the mixing means;

wherein the recycling means comprises buffer means, for temporary storage of the fluid, the control means being adapted to produce a buffer control signal and the buffer means being responsive thereto, for controlled supply of the diluted fluid to the mixing means.

For preference, the apparatus additionally comprises fluid dilution means, connected between the output of the mixing means and input of the detector means, for controlled dilution of the fluid before detection of the physical characteristic thereof.

Preferably, the fluid dilution means comprises further mixing means.

More preferably still, the detector means is adapted to measure the transmission of electromagnetic radiation through the fluid, and the signal representing the physical characteristic is obtained by measurement of the transmission of electromagnetic radiation through the fluid.

According to a second aspect of the present invention, a process for the continuous preparation of a fluid with automatic adjustment of the physical characteristics thereof, comprising the steps of:

(i)—supplying a first component of the fluid to a mixing means;

(ii)—supplying at least one further component of the fluid to the mixing means, each of the components of the fluid being supplied in specified a proportion;

(iii)—mixing the components of the fluid;

(iv)—supplying the mixed fluid to a detector means;

(v)—detecting a physical characteristic of the fluid;

(vi)—comparing the detected physical characteristic of the fluid with a desired physical characteristic thereof;

(vii)—varying the specified proportion of the components of the fluid being supplied to the mixing means, until the detected physical characteristic is substantially the same as the desired physical characteristic; and —(viii) recycling the mixed fluid supplied to the detector means;

such that the step of recycling the mixed fluid supplied to the detector means includes the steps of supplying the fluid to a buffer means and controlling the supply of the fluid from the buffer means to the mixing means, for mixing with the components of the fluid.

For preference, the process further includes the step of diluting the mixed fluid before it is supplied to the detector means.

Preferably, the step of diluting the mixed fluid includes supplying it to a further mixing means.

More preferably still, the step of detecting a physical characteristic of the fluid includes measuring the transmission of electromagnetic radiation therethrough.

BRIEF DESCRIPTION OF THE DRAWINGS

The present invention will now be described in greater detail, by way of example, with reference to the accompanying drawings, in which.

DETAILED DESCRIPTION OF THE INVENTION

Figure 1:
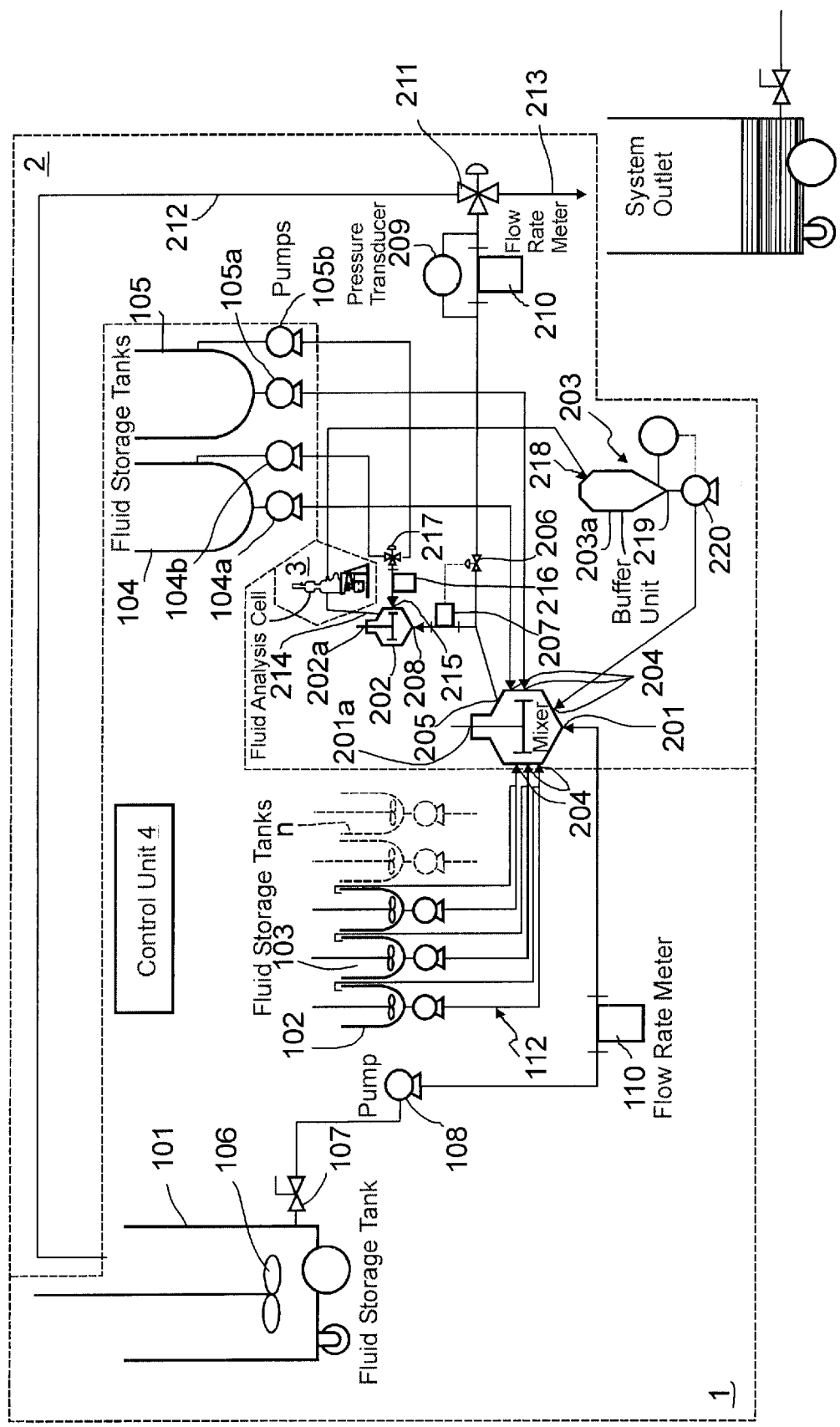
FIG. 1 shows a schematic diagram of an apparatus for the continuous preparation of a fluid with automatic adjustment of the properties of thereof, according to the present invention.

Referring first to FIG. 1 of the drawings, an apparatus for the continuous preparation of a fluid, according to the presently preferred embodiment of the invention, comprises a fluid supply unit 1, connected to a mixer unit 2, for mixing the components of the fluid, mixer unit 2 being connected to a fluid analysis unit 3, for detecting and analysing a specified physical characteristic of the fluid, such as its color, opacity, hue, saturation, luminosity, density, viscosity and/or temperature. Fluid analysis unit 3 is described in detail in patent application PCT/BR96/00046 (see also US national stage patent U.S. Pat. No. 6,288,783, and is included herein by reference. Fluid supply unit 1, mixer unit 2 and fluid analysis unit 3 are connected to a system control unit 4, for controlling the functions of units 1, 2 and 3.

Fluid supply unit 1 comprises fluid storage tanks 101, 102, 103, 104 and 105, used for storing the various components of the fluid to be produced. Where the fluid to be produced is a paint, storage tank 101 is typically a large vat which is used for storing a large quantity of either a concentrate or a base that is to have its characteristic physical properties measured and adjusted should they not be according to a previously determined standard. Storage tank 101 is supplied with a fluid stirrer 106, for ensuring that the fluid is homogenised, and is connected to a valve 107 for controlling release of the fluid to mixer unit 2. A pump 108 is connected to valve 107 and is used to pump the fluid to mixer unit 2 at a flow rate which, depending on specific requirements, can be varied in the range from 1 to 100 litres/min. Pump 108 is connected to a flow rate meter 110 which measures the flow rate of the fluid being pumped by pump 108 from storage tank 101. Control unit 4 controls operation of pump 108 depending on the detected flow rate measured by flow rate meter 110, to ensure that the rate of flow of fluid to mixer unit 2 is constant.

Figure 2:
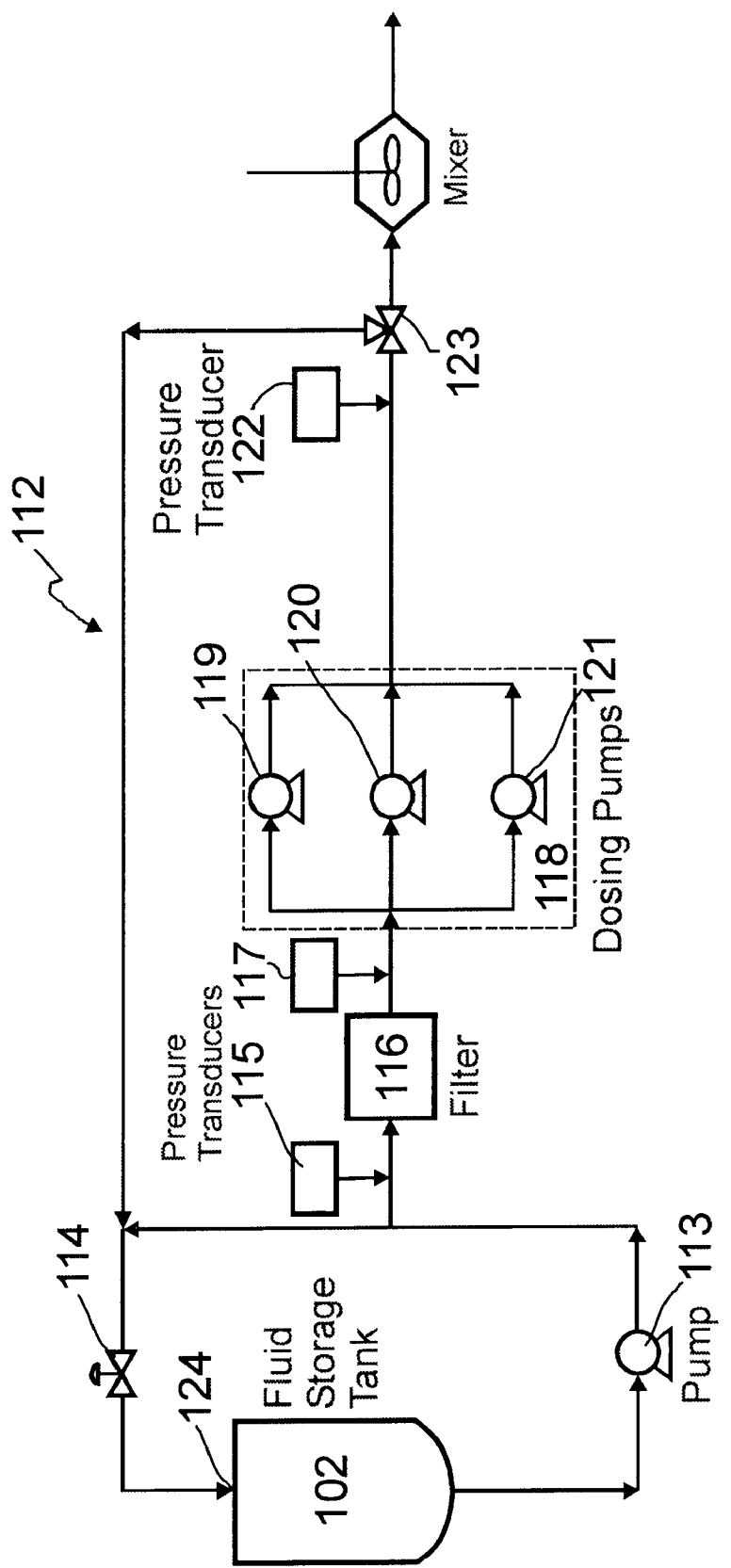
FIG. 2 shows a schematic diagram of a fluid supply unit for supplying a specified amount of a component of the fluid.

Referring now to FIG. 2, each one of fluid storage tanks 102, 103, 104, 105 to n is connected to a dosing apparatus 112. Dosing apparatus 112 is connected to control unit 4 such that a specified amount of each of the fluid components, required to be added to the fluid for adjustment thereof, can be supplied to mixer unit 2.

Each dosing apparatus 112 comprises a pump 113, connected to respective storage tank 102, 103, 104 or 105. Pump 113 is connected to a control valve 114 and via a first pressure transducer 115 to a filter 116. Filter 116 is used to filter out solid particles from the fluid and is connected via a second pressure transducer 117 to a set of pumps 118 comprising, three dosing pumps 119, 120 and 121, connected in parallel with each other. During operation, filter 116 can become saturated with particulate matter, and in order to know when this is happening, the pressure difference between pressure transducers 115 and 117 is calculated in real time. Dosing pumps 119, 120 and 121 are positive displacement pumps, each having a different operating range. For example, 0–80 ml/min, 0–2500 ml/min, and 0–10000 ml/min. Set of pumps 118 is connected via a third pressure transducer 122 to a valve 123 having two outputs, one connected to mixer unit 2, the other connected to control valve 114. Valve 123 allows fluid to be directed either into mixer unit 2, transducer 122 providing information regarding the pressure of injection into mixer unit 2, or to be returned to its respective storage tank 102, 103, 104, or 105, in order to avoid sedimentation of the fluid in the connecting pipes when not in use. Control valve 114 is connected to a fluid inlet 124 of storage tank 102, 103, 104 or 105, and is used to guarantee supply of fluid to dosing pumps 119, 120, and 121 when the fluid is being injected into mixer unit 2. Control valve 114 is controlled automatically by pressure transducer 117.

In operation, dosing apparatus 112 receives a control signal from control unit 4 to supply a specified amount of the fluid stored in storage tank 102, 103, 104 or 105 to mixer unit 2. Initially, fluid is pumped from storage tank 102, 103, 104 or 105 by pump 113 and returned via control valve 114 to fluid inlet 124 of storage tank 102, 103, 104 or 105 until the fluid pressure stabilises at 3 kg/cm$^2$. The pressure is regulated by controlled opening of control valve 114, and is measured by first pressure transducer 115. Once the pressure has stabilised at 3 kg/cm$^2$, one of dosing pumps 119, 120 or 121 is activated depending on the dosage of fluid required to be supplied to mixer unit 2, and valve 123 is opened to allow the fluid to flow in a closed circuit back to fluid inlet 124. Dosing pump 119, 120 or 121 is controlled to vary the pressure of the fluid flowing in the closed circuit until the pressure, measured by third pressure transducer 122, reaches a pressure of 1 kg/cm$^2$ above that in mixer unit 2. Once this pressure has been reached, valve 123 is switched to allow the fluid to flow to mixer unit 2. The percentage of dosing is related to the velocity of either of dosing pumps 119, 120, or 121, which are controlled using invariable frequency drives.

Figure 3:
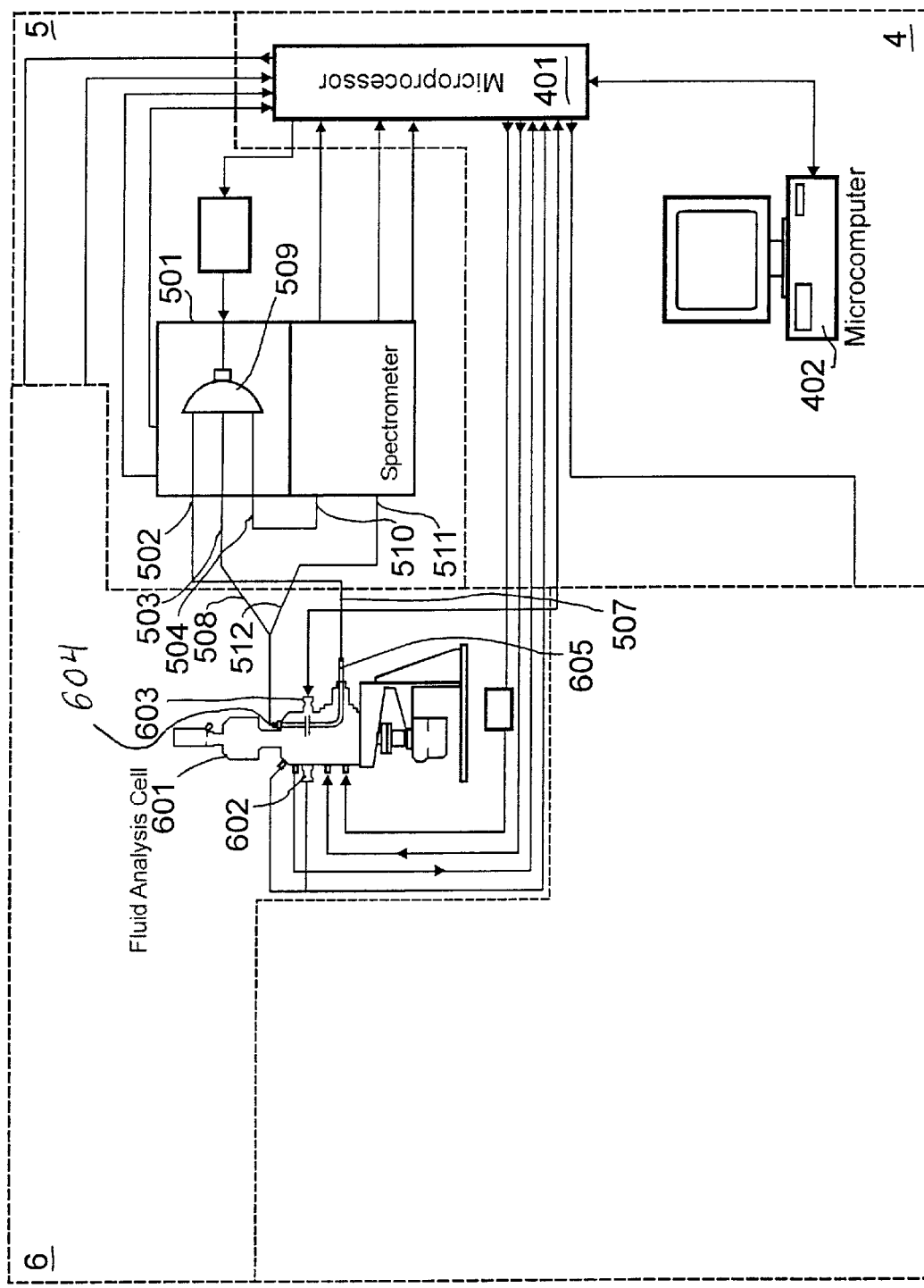
FIG. 3 shows a schematic diagram of a fluid analysis unit for measuring the characteristic properties of the fluid, and a system control unit for controlling the apparatus.

Referring to FIG. 3 of the drawings, fluid analysis unit 3 comprises an optical unit 5, for providing a source of electromagnetic radiation to a detection unit 6 and for sensing electromagnetic radiation emitted therefrom. Both optical unit 5 and detection unit 6 are connected to control unit 4, used for data acquisition and control of the functions of units 5 and 6, as well as for controlling units 1 and 2.

Optical unit 5 comprises a light source 509 having three outputs 502, 503 and 504 for emitting electromagnetic radiation in the visible region of the electromagnetic spectrum. Outputs 502 and 503 are connected to inputs of fiber optic cables 507 and 508 respectively of a standard spectrometer 501. Source 509 comprises an incandescent halogen lamp or xenon flash lamp emitting a range of wavelengths from 400 to 700 nm, the supply for the lamps being electronically stabilised, and the lamps themselves being monitored with respect to their performance so that they may be changed as soon as they go below specification.

Output 504 also receives light from source 509, which is directed by a fiber optic cable (not shown) to an input 510 (reference channel of spectrometer 501). Output 504 serves as a reference for the measurement of the spectra received from detection unit 6.

Optical unit 5 is also provided with an input 511 connected to a fiber optic cable 512 which directs light from detection unit 6 to a detector (not shown).

Detection unit 6, comprises a fluid analysis cell 601 which has a fluid inlet 602 connected to mixer unit 2 and a fluid outlet 603 also connected to mixer unit 2. Light from optical unit 5 is directed via fiber optic cables 507 and 508 to inputs 604 and 605 for transmission and reflection analysis respectively of the fluid in analysis cell 601. Input 604 also acts as output for the light transmitted through or reflected from the fluid and is connected to fiber optic cable 512.

Referring to FIGS. 1 and 3, mixer unit 2 comprises a first mixer 201 having an impeller 201a, a second mixer 202, having an impeller 202a, and a fluid buffer unit 203. First mixer 201 has fluid inlets 204, connected to the dosing apparatus 112 of each of fluid storage tanks 101, 102, 103,,104 and 105, and has two fluid outlets 205, one connected to a valve 206 and the other, via a flow rate meter 207, to a first fluid inlet 208 of second mixer 202.

Valve 206 is connected via a pressure transducer 209 and flow rate meter 210 to a system outlet valve 211 which in turn is connected to a fluid return conduit 212 and to a system outlet 213.

Second mixer 202 has a fluid outlet 214 connected to inlet 602 of fluid analysis cell 601 of detection unit 6, and a second fluid inlet 215 connected via a fluid flow meter 216 to a valve 217. Valve 217 is connected to the dosing apparatus 112 of each of storage tanks 104 and 105.

Fluid buffer unit 203 comprises a temporary storage tank 203a, and a dosing pump 220. Temporary storage tank 203a has a capacity of approximately 5 litres and has a fluid inlet 218 connected to outlet 603 of fluid analysis cell 601, and a fluid outlet 219 connected to dosing pump 220. Pump 220 is connected to fluid inlet 204 of first mixer 201, and is activated, depending upon the signal from a level transducer (not shown) provided in storage tank 203a, so that it continuously re-injects the fluid, which has been sampled and analysed by fluid analysis unit 3, recycling this sampled fluid into first mixer 201.

The entire system is controlled by control unit 4, which comprises a programmable microprocessor 401 connected to a microcomputer 402, for operator control thereof. Microcomputer 402 is provided with analysis and supervision software for analysis and display to an operator of the various parameters of the system. Microprocessor 401 receives and processes both analogical and digital data provided by the various system units 1, 2 and 3, and automatically responds to these signals. Microprocessor 401 activates pump 113 and set of pumps 118 of dosing apparatus 112, controls the pressure of the fluid in dosing apparatus 112 and the level of the fluids in storage tanks 101, 102, 103, 104 and 105. Microprocessor 401 also controls the operation of mixer unit 2, including control of pressure, temperature, rotation of impeller 201a and 202a etc., and receives signals from optical unit 5 and detector unit 6 of fluid analysis unit 3.

Microcomputer 402 receives analogical signals from microprocessor 401 containing data with respect to the intensity of the light passing through the fluid or reflected thereby and converts these signals into digital data representing the transmission or reflection curve of the liquid as a function of wavelength of the light. This data is sent to a calorimeter software, also provided in microcomputer 402, which processes and compares these curves with standard transmission or reflection curves contained in a database. The result of this comparison is sent to the supervision software which has a graphical interface for presentation of data relating to each component of the apparatus (units 1, 2 and 3) to an operator. The supervision software comprises a database containing formulae for the fluid products that the apparatus can produce.

With reference to FIGS. 1 to 3 the preferred embodiment of the process for continuous production of a fluid with automatic adjustment of the physical characteristics thereof comprises the following steps:

Initially, the operator, using microcomputer 402, chooses the fluid product which is to be produced from the list of available products in the database of the supervision software. The database contains the formula for the product giving the proportions of each of the fluid components. As soon as the operator instructs the supervision software that a particular product is required, microprocessor 401 sends a signal to fluid supply unit 1 activating pump 108 to pump the fluid to be analysed and adjusted at a rate of 10 litres/min. At the same time, microprocessor 401 sends signals to dosing apparatus 112 of storage tanks 102, 103, 104 and 105 to provide the correct proportion of fluid components therefrom, depending on the formula for the liquid product stored in microcomputer 402. Dosing apparatus 112 operates as described previously initially to supply a non-adjusted proportion of each of the required components of the fluid to mixer unit 2, the non-adjusted proportion of the components being given by the idealised formula stored in the database.

Mixer unit 2 receives a signal from microprocessor 401 to operate first mixer 201 by rotating fluid impeller 201a to homogenise the fluid which exits from fluid outlet 205. Initially, valve 206 is adjusted to allow a sample of the mixed fluid to flow, at a flow rate of 0.1 litres/min, to second mixer 202. The flow rate of the sample is monitored by flow meter 207, and is used to control the opening of valve 206, via microprocessor 401, to maintain a fixed flow rate of sample fluid to second mixer 202.

At the same time as the fluid sample is supplied to mixer 202, dosing apparatus 112 of either or both of storage tank 104 and/or 105 is activated to supply a fluid dilution component at a flow rate of, for example, 0.9 litres/min to produce a dilution of 900%. The flow rate of the dilution fluid is monitored by flow meter 216, which provides a signal that is used to control the RPM of metering pumps 104a, 104b and 105a, 105b of storage tanks 104 and 105 respectively, via microprocessor 401, in order to maintain a fixed flow rate of dilution fluid to second mixer 202. Dilution of the sample is only necessary where the sensitivity of detection unit 6 needs to be increased to produce a transmission spectrum. Such would be the case where the fluid to be produced is a paint concentrate with a high saturation.

The fluid sample (undiluted or diluted) passes through fluid analysis cell 601 where it is analysed, the results of the analysis being used by microprocessor 401 to increase or diminish the flow of each of the components of the fluid from dosing apparatus 112. The delay time, between making an adjustment to the proportion of each of the fluid components and receiving the results of the spectral analysis of the resulting fluid, is calculated as 25.5 seconds. Thus, analysis of the fluid should be carried out every 30 seconds or less.

Fluid analysis unit 3 is provided continuously with a sample of the fluid to be analysed coming from second mixer 202. On exiting from fluid analysis unit 3, the sampled fluid is directed to temporary storage tank 203a of fluid buffer unit 203, from which it is pumped by pump 220 at a controlled low flow rate into first mixer 201. As soon as pump 220 is activated the flow rate of dilution fluid, supplied from storage tanks 104 and/or 105 by respective fluid supply apparatus 112 to first mixer 201, is proportionally decreased in order to compensate for the addition of dilution fluid from buffer 203. The rate of flow of the diluted sample fluid from buffer 203 to mixer 201 is controlled so that buffer 203 is empty when the required adjustments have been made to the fluid such that it has the required properties.

While the fluid sample, mixed by mixer 202 and analysed by fluid analyser unit 6, does not correspond to the required fluid product, the rest of the fluid exiting from mixer 201 is directed via system outlet valve 211 through fluid return conduit 212 to fluid storage tank 101. As soon as the fluid sample corresponds to the required product, valve 211 is moved to the discharge position to allow all the fluid flowing from first mixer 201 to flow to system outlet 213.

Sampling of the fluid may be carried out at intervals during production of a batch of the fluid to ensure that it has the required properties.

Once a particular batch of fluid has been produced, the apparatus is cleaned automatically by injecting solvent into the system, at a pressure of 7 kg/cm2, together with a nitrogen/air mix.

It should be observed that advantageous physical changes to the apparatus itself may be apparent to those skilled in the art, and as such, the scope of the present invention should be limited only by the terms and interpretation of the following claims.

What is claimed is:

1. An apparatus for the continuous preparation of a fluid with automatic adjustment of the physical characteristics thereof, comprising:

storage means (101), for storing a first component of said fluid;

at least one further storage means (102, 103, 104, 105, n), for storing at least one further component of said fluid;

mixing means (201), for mixing said first component and said at least one further component of said fluid, said mixing means (201) being provided with a fluid input (201, 204) and a fluid output (205);

fluid supply means (107, 108, 110, 112, 104a, 104b, 105a, 105b), in communication between said storage means (101, 102-n, 104, 105) and said input (204) of said mixing means (201), for supplying a specified proportion of each of said components of said fluid to said mixing means (201);

detector means (3), for detecting a physical characteristic of said fluid, said detector means (3) being capable of producing a signal representing said detected physical characteristic, said detector means having a fluid input (602) in communication with said fluid output (205) of said mixing means (201);

control means (4), adapted to receive said signal representing said detected physical characteristic, said control means (4) being capable of comparing said detected physical characteristic with a desired physical characteristic of said fluid, and of producing a fluid supply control signal, dependent on said comparison between said detected physical characteristic and said desired physical characteristic, said fluid supply means (107, 108, 110, 112, 104a, 104b, 105a, 105b) being responsive to said fluid supply control signal to vary said proportion of each of said components of said fluid supplied to said mixing means (201); and fluid recycling means (203, 220), in communication between a fluid output (603) of said detector means (3) and said input (204) of said mixing means (201), to enable fluid to return to said mixing means (201);

wherein said fluid recycling means (203, 220) transports the fluid content of said mixing means to a buffer means (203) for temporary storage while said detected physical characteristic of said fluid differs from said desired physical characteristic, and that said control means (4) produces a buffer control signal, said buffer means (203) being responsive thereto, for controlled supply of said fluid from said buffer means to said mixing means (201) once said detected physical characteristic is substantially the same as said desired physical characteristic.

2. An apparatus according to claim 1, further comprising fluid dilution means (104, 105, 202), connected between said output (205) of said mixing means (201) and said input (602) of said detector means (3), for controlled dilution of said fluid before detection of said physical characteristic thereof.

3. An apparatus according to claim 2, wherein said fluid dilution means (104, 105, 202) comprises further mixing means (202).

4. An apparatus, according to claim 3, wherein said detector means (3) is adapted to measure the transmission of electromagnetic radiation through said fluid, and that said signal representing said physical characteristic is obtained by measurement of the transmission of electromagnetic radiation through said fluid.

5. An apparatus according to claim 2, wherein said detector means (3) is adapted to measure the transmission of electromagnetic radiation through said fluid, and that said signal representing said physical characteristic is obtained by measurement of the transmission of electromagnetic radiation through said fluid.

6. An apparatus according to claim 1, wherein said detector means (3) is adapted to measure the transmission of electromagnetic radiation through said fluid, and that said signal representing said physical characteristic is obtained by measurement of the transmission of electromagnetic radiation through said fluid.

7. An apparatus according to claim 1, further comprising further fluid recycling means (212, 101, 108) connected between said fluid output (205) and said fluid input (204) of said mixing means (201), such that a portion of said fluid content of said mixing means may be directed to said fluid recycling means (203, 220) and the remainder to said further fluid recycling means, said further fluid recycling means being adapted to transport said remainder of said fluid content of said mixing means to a further buffer means (101) for temporary storage while said detected physical characteristic of said fluid differs from said desired physical characteristic, said control means (4) being adapted to produce a further buffer control signal, said further buffer means being responsive thereto, for controlled supply of said fluid from said further buffer means to said mixing means (201) once said detected physical characteristic is substantially the same as said desired physical characteristic.

8. A process for the continuous preparation of a fluid with automatic adjustment of the physical characteristics thereof, comprising the steps of:

(i)—supplying a first component of said fluid to a mixing means (201);

(ii)—supplying at least one further component of said fluid to said mixing means (201), each of said components of said fluid being supplied in a specified proportion;

(iii)—mixing said components of said fluid;

(iv)—supplying said mixed fluid to a detector means (3);

(v)—detecting a physical characteristic of said fluid to produce a signal representing said detected physical characteristic;

(vi)—receiving said signal representing said detected physical characteristic, and comparing said detected physical characteristic of said fluid with a desired physical characteristic thereof to produce a fluid supply control signal, dependent on said comparison between said detected physical characteristic and said desired physical characteristic;

(vii)—varying said specified proportion of said components of said fluid being supplied to said mixing means in response to said fluid supply control signal;

(viii)—recycling said mixed fluid supplied to said detector means; and wherein the step of recycling said mixed fluid supplied to said detector means includes the steps of transporting the fluid content of said mixing means (201) to a buffer means (203) for temporary storage while said detected physical characteristic of said fluid differs from said desired physical characteristic, and controlling the supply of said fluid from said buffer means (203) to said mixing means (201) once said detected physical characteristic is substantially the same as said desired physical characteristic.

9. A process according to claim 8, further including the step of diluting said mixed fluid before it is supplied to said detector means.

10. A process according to claim 9, wherein said step of diluting said mixed fluid includes supplying said mixed fluid to a further mixing means (202).

11. A process according to claim 10, wherein said step of detecting a physical characteristic of said fluid includes measuring the transmission of electromagnetic radiation through said fluid.

12. A process according to claim 9, wherein said step of detecting a physical characteristic of said fluid includes measuring the transmission of electromagnetic radiation through said fluid.

13. A process according to claim 8, wherein said step of detecting a physical characteristic of said fluid includes measuring the transmission of electromagnetic radiation through said fluid.

* * * * *